Dec. 27, 1927.
P. J. GALLAGHER
1,653,955
CAR BRAKE CONTROLLING DEVICE
Filed April 19, 1926
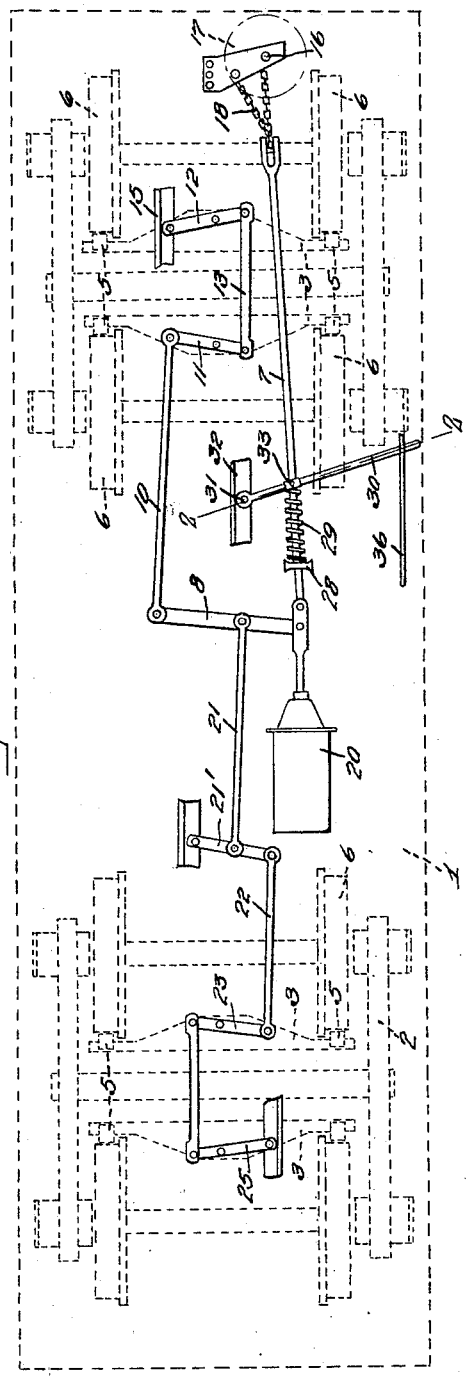
Inventor;
Philip J. Gallagher
By his Attorney,
Horace Barnes.

Patented Dec. 27, 1927.

1,653,955

UNITED STATES PATENT OFFICE.

PHILIP J. GALLAGHER, OF FALLBRIDGE, WASHINGTON, ASSIGNOR OF ONE-FOURTH TO NELLIE N. EGAN, OF WISHRAM, WASHINGTON, AND ONE-EIGHTH TO WILLIAM F. ROGERS, OF PORTLAND, OREGON.

CAR-BRAKE-CONTROLLING DEVICE.

Application filed April 19, 1926. Serial No. 102,958.

This invention relates to improvements in car-brakes and particularly to those applied upon freight or tank cars.

The object of the invention is the provision of simple and economically constructed and applied devices for instantaneously setting the brakes upon a car from the side of the car, either from the ground or from a conveniently positioned hand or foot hold for the operator upon the side of the car.

A further object of my invention is to provide a car-brake apparatus which may be maintained in slack, inoperative condition under spring tension and which may be manipulated from the ground on the side of the car by means of a suitable hand-lever to release the spring tension to exert its power in the setting of the brakes.

Other objects and advantages residing in my invention and objects relating to details of construction and arrangement of the parts thereof will be fully set forth in the detailed description to follow.

The accompanying drawings illustrate by way of example one form in which my invention may be embodied, in which:

Figure 1 is a plan view of car-brake apparatus embodying my invention shown diagrammatically mounted upon a railway car, indicated in broken lines.

Fig. 2 is a view in cross-section upon an enlarged scale, as upon line 2—2 of Fig. 1.

Fig. 3 is a view in side elevation of an element of the invention, detached.

Referring to said views the reference numeral 1 indicates a car-body which is mounted upon the truck 2 shown in broken lines. Brake-beams 3 are mounted in said trucks having brake-shoes 5 engaging the wheels 6 in the usual manner.

Said brake-beams are actuated to apply the brakes through actuating devices of which a typical and standard example is shown in Figure 1.

An operating rod 7 is provided to which a lever 8 is connected which, through link 10, actuates the brake-beams 3 of the forward truck through swinging levers 11 and 12 that are connected by a link 13. The swinging lever 12 is pivotally connected to a bracket 15 upon the bottom of the car.

The rod 7 may be actuated through a brake-staff 16 upon which a hand-wheel 17 is mounted connected to the operating rod by means of a chain 18 in the usual manner.

The lever 8 may be actuated also by means of the usual air-brake cylinder indicated at 20.

The brake-beams upon the truck at the opposite end of the car are operated through a link 21 connected midway of the lever 8 at one end and to a swinging lever 21' at its other end. The lever 21' is connected by a link 22 with arms 23 and 25 upon which brake-beams are mounted.

The operating rod 7 is provided with a set-collar 26 formed with vertically and oppositely directed trunnion-pins 27. Spaced from said collar is a bracket 28 rigidly mounted upon the bottom of the car having an aperture through which the rod 7 extends. A coil-spring 29 mounted about said rod is interposed between the bracket 28 and the set-collar 26 tending to urge the operating rod forwardly or in the direction to swing the lever 8 to set the brakes.

A hand-lever 30 is pivotally mounted at 31 in a bracket 32 upon the car-bottom positioned toward the center of the car from the operating-rod 7. Said rod is formed with a yoke 33 extending about the set-collar 26 and having slots 35 formed therein to receive the respective trunnion-pins 27.

Adjacent the outer edge of the car-body a longitudinally directed latch-plate 36 is rigidly mounted through an angularly directed flange 37. Said plate is formed with a horizontally disposed slot 38 extending substantially its entire length. At the rearward end of said slot it is connected by a vertically disposed portion 40 with a shorter horizontally disposed slot 41.

The outer extremity of said hand-lever 30 protrudes through the slot 38 extending somewhat therebeyond to admit of a hand-grip.

The central portion of the plate 36 is positioned laterally opposite the lever-pivot 31 and under the released tension of the spring 29 the hand-lever 30 will be urged by the spring to the forward extremity 42 of the slot 38.

In this position of the hand-lever the force of the spring 29 is exerted upon the rod 7 through its engagement with the set-collar 26 to actuate the brakes into their set operative positions.

When the brakes are thereby released, the operator will grasp the outer end of the hand-lever 20 and force the same rearwardly along the slot 38 to compress the spring against the bracket 28 and then by an upward movement through the connecting portion 40 of the slot will release the hand-lever to seat in the latch portion 41 of the slot where the spring will be maintained in compressed condition and the brakes released and maintained in such condition.

To set the brakes through the operation of my improved device the operator need only grasp the hand-lever 30 and push the same rearwardly in the slot 41 and downwardly through the vertical portion 40 into the slot 38 and release the same, whereupon the tension of the spring will cause the hand-lever to fly forwardly to the end 42 which will release the spring and cause the brakes to be set as has been heretofore described.

The advantages residing in my invention will be plainly evident, as it admits of the brakes upon each car being manipulated from the ground or, according to where the spring-actuating device of my invention may be situated, from the forward platform of the car or at any convenient location.

This avoids the necessity of the brakeman climbing the cars to manipulate the hand-wheel 17 and avoids serious risk of accident in climbing about the cars in icy weather.

These devices of my invention will not be affected by snow or ice as is now frequently the case with the hand-wheel operated brake apparatus. Such hand-wheel apparatus, however, may be maintained upon the car, as they are at present equipped, and the devices of my invention added thereto at a slight additional cost.

It is apparent that apparatus similar or equivalent to my invention as shown may be mounted at various parts of the car where desired or upon either side and will afford a most convenient and safe factor in the manipulation of the car-brakes.

From the foregoing description taken in connection with the accompanying drawings the advantages of the construction and application of my improved car-brake controlling devices will be readily apparent, but, while I have described the principle of operation of the invention together with the devices which I now consider the best embodiment thereof, it will be understood that the structures shown are merely illustrative, and that such changes may be made therein as will lie within the scope of the following claim.

Having described my invention, what I claim, is:—

Car-brake controlling apparatus, consisting in combination with wheel-brakes and devices for actuating the same of a spring arranged to exert pressure in directions to set said brakes, a manually controlled lever operable from the ground and arranged to compress said spring, and a plate rigidly mounted upon the side of the car, said plate having a longitudinal slot therein to receive the handle of said lever extending the distance of the maximum travel of the handle and a smaller slot in parallel therewith at one end connected to the first named slot through which the lever may be releasably held to compress the spring.

PHILIP J. GALLAGHER.